(12) United States Patent
Engstrom et al.

(10) Patent No.: US 10,231,461 B2
(45) Date of Patent: Mar. 19, 2019

(54) STEAM GENERATING SYSTEM

(71) Applicant: REVENT INTERNATIONAL AB, Upplands Vasby (SE)

(72) Inventors: Olof Engstrom, Huddinge (SE); Per Junesand, Stockholm (SE); Tom Halve, Norrtalje (SE)

(73) Assignee: REVENT INTERNATIONAL AB, Upplands Väsby (SE)

( * ) Notice: Subject to any disclaimer, the term of this patent is extended or adjusted under 35 U.S.C. 154(b) by 596 days.

(21) Appl. No.: 14/902,921

(22) PCT Filed: Jul. 3, 2014

(86) PCT No.: PCT/SE2014/050847
§ 371 (c)(1),
(2) Date: Jan. 5, 2016

(87) PCT Pub. No.: WO2015/002603
PCT Pub. Date: Jan. 8, 2015

(65) Prior Publication Data
US 2016/0150797 A1  Jun. 2, 2016

(30) Foreign Application Priority Data

Jul. 5, 2013 (SE) ..................... 1350846
Sep. 25, 2013 (SE) ..................... 1351103

(51) Int. Cl.
*A21B 3/04* (2006.01)
*F24C 15/32* (2006.01)

(52) U.S. Cl.
CPC .............. *A21B 3/04* (2013.01); *F24C 15/327* (2013.01)

(58) Field of Classification Search
CPC ................ A21B 3/04; F24C 15/327
(Continued)

(56) References Cited

U.S. PATENT DOCUMENTS 3,954,053 A    5/1976  Johansson et al.
4,202,259 A    5/1980  Johansson
(Continued)

FOREIGN PATENT DOCUMENTS

EP    1 384 406 A1    1/2004
GB    2 245 136 A     1/1992
WO    93/24234 A2     12/1993

OTHER PUBLICATIONS

International Search Report, dated Dec. 3, 2014, from corresponding PCT application.

*Primary Examiner* — Dana Ross
*Assistant Examiner* — James F Sims, III
(74) *Attorney, Agent, or Firm* — Adsero IP

(57) ABSTRACT

A steam generating system in an oven includes an external housing which encloses an oven chamber, a hot air channel where hot air is about to flow and a hot air inlet in the form of a series of openings in the wall of the oven chamber through which hot air is blown into the oven chamber, an exhaust outlet via which hot air is removed from the oven chamber and a door. The steam generating system includes a control unit adapted to control a baking or cooking procedure by generating control signals, and an elongated steam generating module horizontally arranged in the hot air channel, the steam generating module being rotatable along a longitudinal axis and including steam module elements. Each steam module element is elongated and includes one main surface provided with a generally flat extension, the steam generating elements are arranged in parallel above each other.

19 Claims, 6 Drawing Sheets

(58) Field of Classification Search
USPC .............. 219/400; 126/20; 99/467, 473, 474, 99/480; 392/324, 347, 348, 350
See application file for complete search history.

(56) References Cited

U.S. PATENT DOCUMENTS

| | | |
|---|---|---|
| 5,653,164 A | 8/1997 | Vallee |
| 2004/0107953 A1 | 6/2004 | Hegge et al. |
| 2008/0078371 A1* | 4/2008 | Boscaino ................. A21B 3/04 126/20 |

\* cited by examiner

STEAM GENERATING SYSTEM

FIELD OF THE INVENTION

The present invention relates to a steam generating system according to the preamble of the independent claim, and more specifically a steam generating system for an oven.

BACKGROUND OF THE INVENTION

Hot air baker's rack ovens are known in which the goods which are to be baked are introduced on baking sheets arranged on square or rectangular trays or pans held in a quadratic wheeled rack. The rack is intended to be introduced into the oven chamber of the oven and to remain there while the baking process takes place. The oven chamber has a rectangular, square or circular horizontal cross-section (i.e. the cross-section when viewed from above is rectangular, square, or circular) and is dimensioned to accept a rack and allow it to be rotated. Hot air can be introduced via one or two corner vents into the oven chamber to bake the goods. This leads to a temperature gradient across the oven chamber which can lead to uneven cooking of the goods. In order to reduce uneven baking of the goods, the rack is rotated around a vertical axis during the baking process. This can be achieved by placing the rack on a turntable during the baking process or by lifting the rack with a rotatable hook which is rotated during the baking process. Once the baking process is finished the rack is removed (after being lowered and decoupled from the hook if such a hook is used) from the open rack oven. An example of such a rack oven is known from U.S. Pat. No. 3,954,053. This has a substantially rectangular oven chamber with a straight back wall, two parallel, spaced-apart side walls arranged perpendicular to the back wall and a curved door able to close off the front end of the oven chamber.

In the following description features which are well-known in the art such as hot air supply and exhaust systems are not described in detail except where necessary to aid comprehension of the invention.

A conventional rack oven has an external housing which encloses an oven chamber, a hot air channel where hot air is about to flow and a hot air inlet in the form of a vertical series of horizontal openings in the wall of the oven chamber though which hot air is blown into the oven chamber, an exhaust outlet via which hot air is removed from the oven chamber and a door. As is normal in baker's ovens, at least some of the exhausted air is conveyed by a fan through suitable ducting past a heater and re-introduced into the oven chamber via hot air inlet.

The food products are placed on pans, trays, slings or other suitable supports in a wheeled rack which is transported into the oven chamber and the shape of the openings in the hot air inlet are preferably designed so that hot air will flow in a desired manner through the oven chamber. Preferably the hot air flow is arranged so that the heating of the goods being baked is even, with an even transfer of heat from the top to bottom of the rack and from the outer edge to the centre of the baking tray. This can be achieved by angling the opening upwards so that the air flows hit the baking trays at an upward angle to provide heat to the underside of the goods being baked. The products in the oven are thus heated by being directly touched by a stream of hot air as well as indirectly through the trays that they lie on. The wheeled rack is preferably supported from the ceiling of the oven chamber by a powered rack rotating mechanism for rotating the rack which rotates about a substantially vertical axis.

Hot air for cooking food in baker's ovens can be produced by burning a fuel in a burner and transferring the heat in the exhaust gases via a cross-flow tube heat exchanger to cooking air without the cooking air being contaminated by the exhaust gases.

One object when designing baker's ovens is to improve the energy efficiency of the oven and at the same time keep the footprint of the oven as small as possible without decreasing the baking capacity of the oven.

Steam is preferably used early in a baking procedure in order to influence the elasticity of the bread surface and in addition to make the surface glossy.

The steam is normally supplied via the hot air channel into the oven chamber via the openings.

The boiling speed affects the baking of the goods in an oven because the gluten on the surface crystalize and form a surface that can expand without cracks. Steam causes this by the wetting of the surface together with the immediate transfer of energy, when steam condensate to water on the surface on the dough. If steam is not added the surface dries and forms a dry surface. Therefore the speed of evaporation is important.

The object of the present invention is to achieve an improved steaming procedure of a baking or cooking procedure by increasing the evaporation speed and minimizing influence of the hot air flow during the main baking procedure.

SUMMARY OF THE INVENTION

The above-mentioned object is achieved by the present invention according to the independent claim.

Preferred embodiments are set forth in the dependent claims.

The object is achieved by the present invention by arranging a steam generating module in a hot air flow channel of a bakery oven.

The steam generating module is configured to be in two states, a steam generating state and a hot air state. The different states are achieved by rotating the module approximately 90 degrees along its longitudinal axis.

The system according to the present invention take advantage of the so-called Leidenfrost effect which makes the water in the shape of water bubbles to move, due to the evaporation cushion beneath the bubble, on the surface of the steam module element. As the water moves on the surface more steam is generated.

During the steam generating state the water seems to 'float' on the main surface during evaporation, and the idea behind one aspect of the present invention is to give the evaporated water a place to escape in order to further improve the evaporation speed. At the same time as the surface area for preheating the water is increased before it travels on to the next row of plates. By providing specific surface structures of the main surface an improved evaporation has been achieved.

According to one embodiment this is achieved by creating different surface levels on the main surface of the steam generating element so that the surface consists of at least two surface levels, an upper surface level, a first lower level, a second lower level, etc.—one where the water floats and a second, or further, under it, where the gas can escape. The main surface is essentially horizontally oriented when the steam procedure takes place.

When water is supplied to the main surface the immediate evaporation results, on the upper surface level, in that a gas bubble under the water is formed. This will force the water up away from the surface. The lower surface level(s) will also heat the water and the gas pressure that is needed to lift the water is increased and the evaporation speed is increased.

The different surface levels are constructed by providing channels or indentations on the main surface where the evaporated gas can leak out so as not to trap the gas. This will force a continuous evaporation until the energy isn't enough to keep the water above the surface. The water will evaporate until the surface has reached an equilibrium state with the surrounding, which depends on the pressure, temperature and humidity.

The size and height difference of the different levels are dependent on the mass, surface area and material. It interplays between amount of steam that can be produced, surface area and desired steam speed.

In one embodiment the main surface is made up from two surface levels, the upper surface level has an area A and the first lower surface level has an area B.

The relationship between A and B is one way to define capabilities of the main surface. By amending the quotient AB different evaporation speeds may be achieved.

In another embodiment, through-going openings, e.g. quadratic or rectangular openings are provided in the main surface of the steam module elements that will allow excess water to fall to the steam module element below, where the same procedure takes place, i.e. evaporation.

The steam module elements may preferably be provided with angled side surfaces and the purpose of the angled side surfaces is to return the water to the main surface.

SHORT DESCRIPTION OF THE APPENDED DRAWINGS

Figure 5:
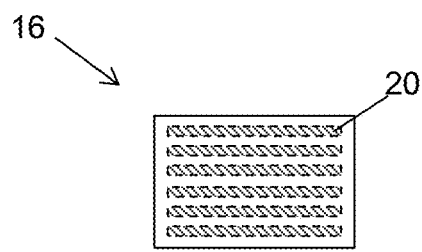
Figure 6:
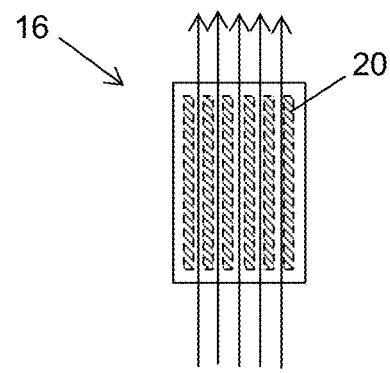

FIGS. 5 and 6, respectively, show schematically the steam generating module in the two different states.

Figure 7:
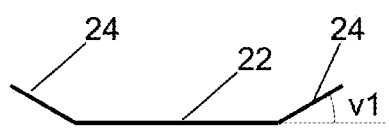
Figure 8:
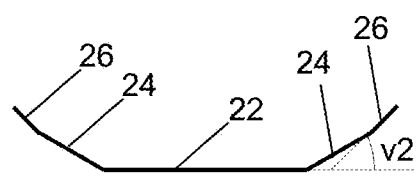

FIGS. 7 and 8, respectively, show cross-sectional views of different embodiments of steam module elements according to the present invention.

Figure 9:
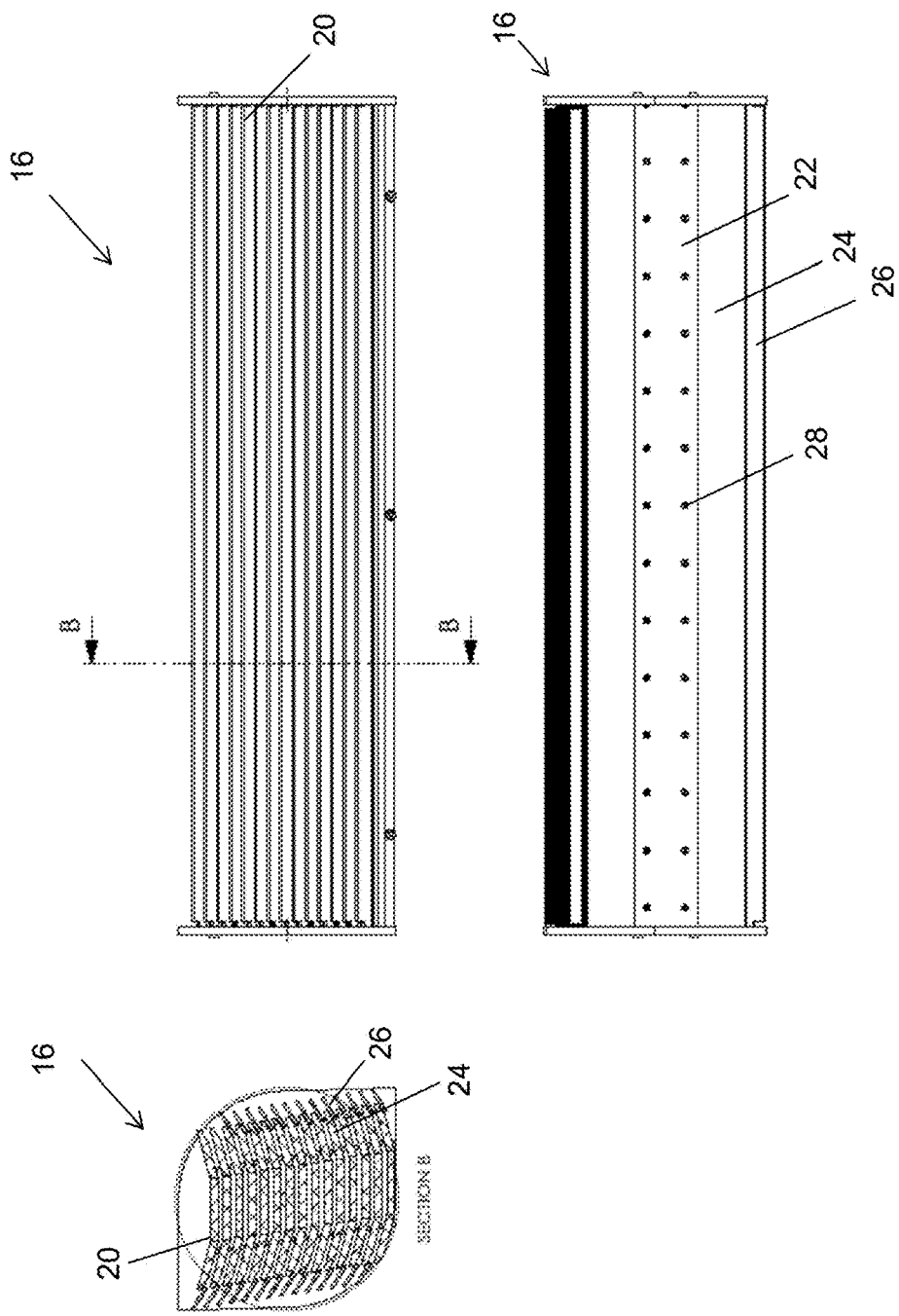

FIG. 9 show different views of a steam generating module according to the present invention.

Figure 10:
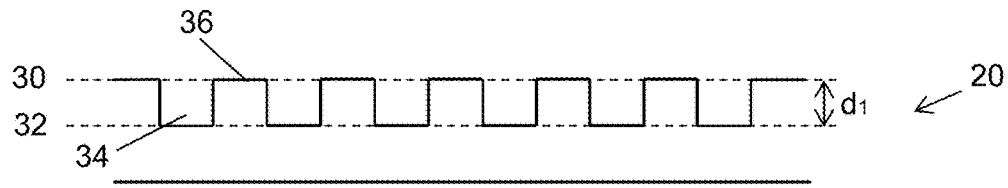
Figure 11:
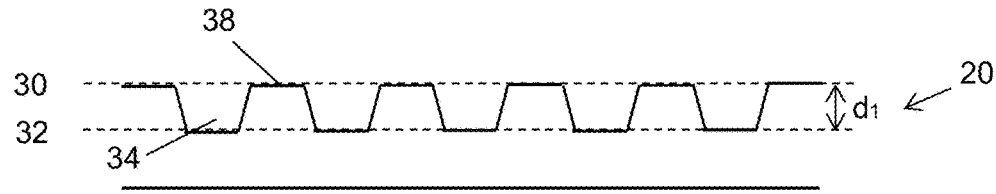
Figure 12:
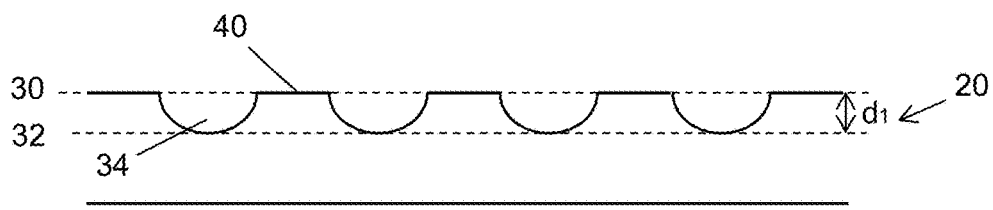

FIGS. 10-12 show cross-sectional views of the steam generating element according to different embodiments.

Figure 13:
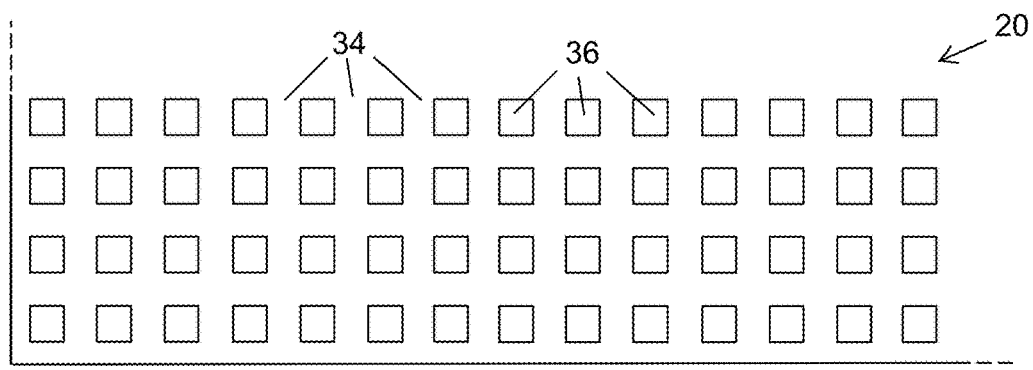
Figure 14:
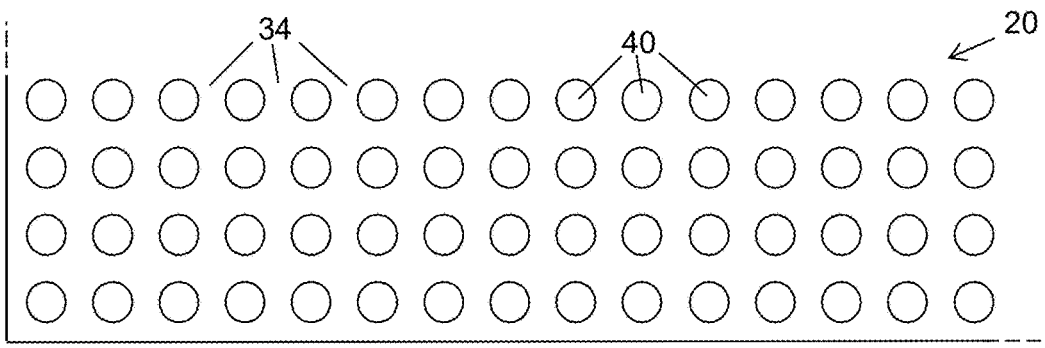

FIGS. 13 and 14 show top views of the steam generating element, according to different embodiments of the invention.

Figure 15:
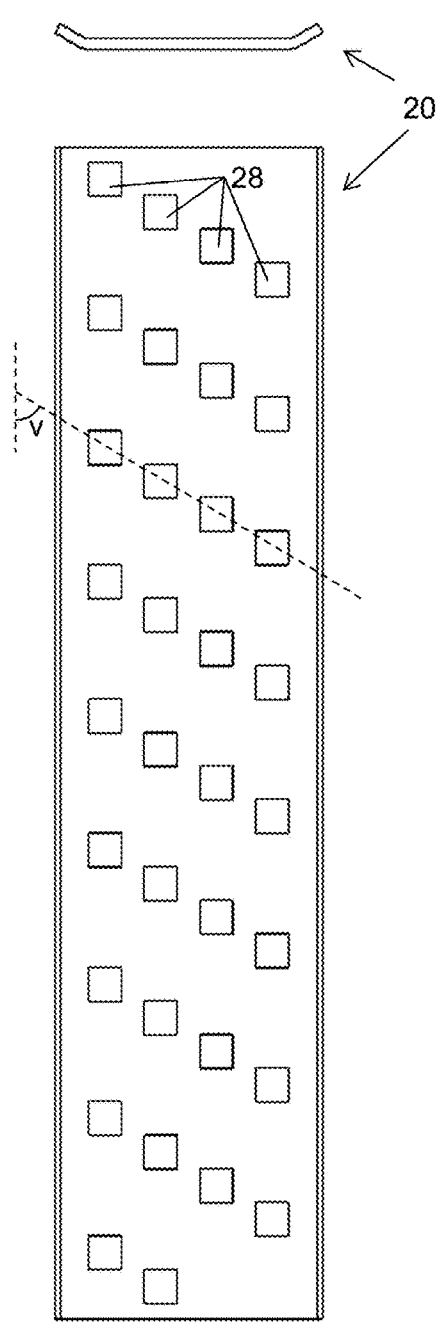
Figure 16:
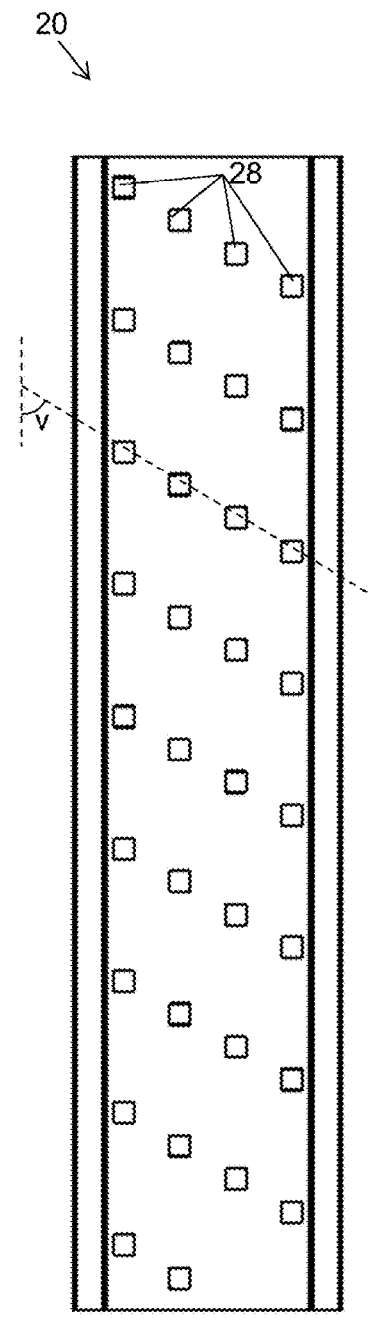

FIGS. 15 and 16 show top views of the steam generating element, according to further embodiments of the invention.

Figure 17:
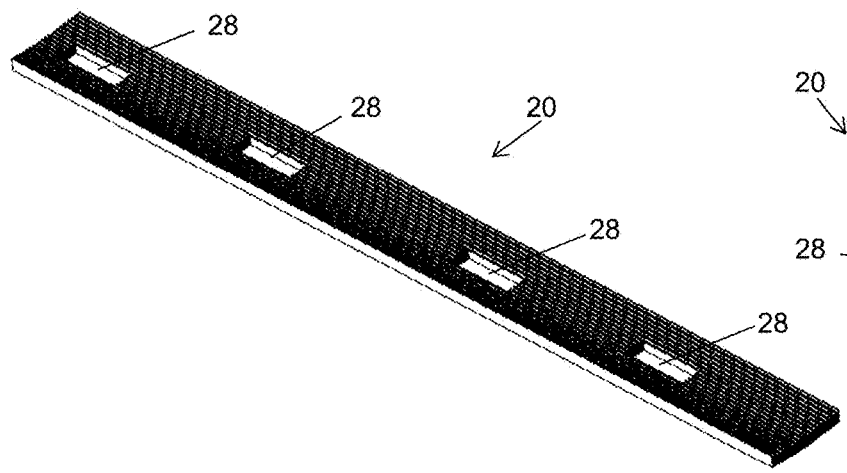
Figure 18:
Figure 19:
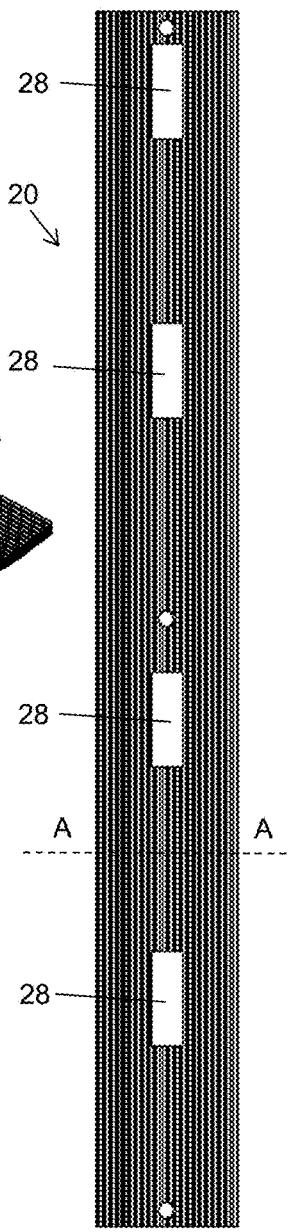

FIGS. 17-19 show a perspective view, a cross-sectional view and a top view, respectively, of the steam generating element, according to still further embodiments of the invention.

DETAILED DESCRIPTION OF PREFERRED EMBODIMENTS OF THE INVENTION

With references to the appended figures the invention will now be described in detail. Throughout the figures the same reference signs have been used to denote the same or similar items.

Figure 1:
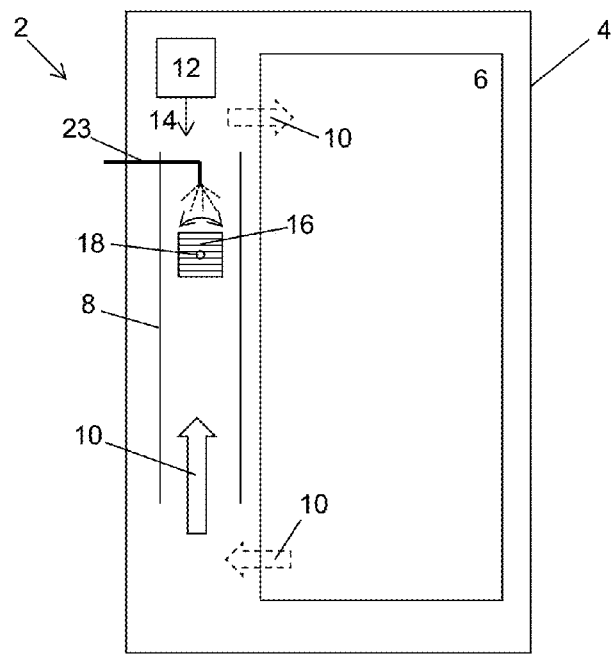
FIG. 1 is a simplified schematic block diagram illustrating an oven including a steam generating system according to the present invention.

First with reference to FIG. 1 the present invention relates to a steam generating system in an oven 2. The oven 2 comprises an external housing 4 which encloses an oven chamber 6, a hot air channel 8 where hot air 10 is about to flow. The oven is further provided with a hot air inlet in the form of a series of openings (not shown) in the wall of the oven chamber 6 through which hot air is blown into the oven chamber 6, which is illustrated by a dashed block arrow, an exhaust outlet (not shown) via which hot air is removed from the oven chamber 6, which is illustrated by a dashed block arrow, and a door (not shown). Note that the direction of the hot air may, as an alternative, be in a direction opposite to the direction illustrated in FIG. 1.

The steam generating system comprises a control unit 12 adapted to control a baking or cooking procedure by generating control signals 14. The control unit 12 may be programmed by input of instructions via an input means (not shown) which may be a keyboard, a touchscreen, etc. where an operator may choose a specific baking or cooking procedure.

The steam generating system further comprises an elongated steam generating module 16 horizontally arranged in said hot air channel 8. The steam generating module 16 being rotatable along a longitudinal axis 18 and comprising a predetermined number of steam module elements 20 (see FIGS. 2-9). Each steam module element 20 is elongated and comprises one main surface 22 provided with a generally flat extension, and the steam generating elements 20, in one module are arranged in parallel above each other at a predetermined distance from each other. The number of elements in one module is preferable within the range of 5-15.

The system further comprises at least one water supplying member 23 arranged in connection to said steam generating module 16 and configured to supply water to said module 16.

According to one embodiment the steam generating module 16 is configured to be in two states:

a steam generating state where the main surfaces 22 of the elements 20 are in an essentially horizontal position, allowing water to evaporate when water is supplied to the module, a hot air state where the main surfaces 22 of the elements 20 are in an essentially vertical position, allowing hot air to pass the module 16.

The steam generating module 16 is configured to be rotated (tilted) 90° around its longitudinal axis 18 in dependence of control signals 14 generated by said control unit 12, when going from the steam generating state to the hot air state, and when going back from the hot air state to the steam generating state. The rotation is performed by a suitable rotation unit (not shown) which is arranged such that the module may be rotated around a rotation axle that coincide with the longitudinal axis of the module. The rotation unit may e.g. be a step motor.

The steam generating system is adapted to heat said steam generating module 16 prior the module is to be in the steam generating state. The heating is e.g. performed by applying hot air to the module. The module is heated to a temperature such that the so-called Leidenfrost effect will occur when water is supplied to the module. The hot air is conventionally heated, e.g. via a heat exchanging module, or via heating elements.

Thus, the upper surface of each steam module element, where the evaporation is to take place, is overheated.

According to the Leidenfrost effect, which will be described below, optimal evaporation takes place at 30° C. above the saturation point, i.e. the boiling point, at a present pressure.

Presently used steam systems for bakery ovens normally use temperatures way above this temperature threshold, e.g. 100°-120° C. above. In that case a gas bubble is formed beneath the water which bubble has a temperature insulating effect and prevents evaporation. A consequence of this phenomenon is that the water bubbles may easily move over a surface as there is very low friction to the surface. The water may also "climb" upwards on surfaces, dependent upon the structure and elevation of the surface.

The steam module element, according to the present invention, is shaped to take advantage of the described phenomenon related to the Leidenfrost effect.

The surface of the steam module element is preferably provided with small indentations or grooves, which further improves the Leidenfrost effect.

The steam module elements are preferably made from a metal and one suitable material is aluminium. Aluminium is advantageous in that it can store more energy in relation to weight in comparison to e.g. steel, and in addition that the module will be considerably lighter than if made from e.g. steel. Other possible materials are any ferrite stainless material, e.g. chromium steel.

Preferably the steam module element is moulded, whereas it is then possible to obtain a desired structure of the surface, e.g. to include grooves or indentations. Another requirement of the material is that it must be approved by relevant authorities in the food industry.

The size of a module, e.g. the length and the width, and also of the steam module elements, is adapted to the space available in hot air channel of the oven. According to one implementation the length is approximately 300 mm, and the width is approximately 140 mm. The thickness of a steam module element is approximately 4-8 mm, preferably around 6 mm. The distance between the elements is in the range of 2-6 mm, preferably 4 mm.

The rotation of the module may be achieved, as discussed above, by rotating the module around the longitudinal axis running through the centre of the module as indicated in the figures. As an alternative, the module may be rotated, or tilted, by rotation about a longitudinal axis running along one of the corners of the module when seen from the short side of the module.

In particular with reference to the cross-sectional view of a steam module element illustrated in FIG. 7, one embodiment of the steam module element 20 will now be described. The element comprises one main surface 22 and two side surfaces 24, where each side surface 24 is arranged along a long side of the main surface, wherein each side surface is inclined in relation to the main surface such that the steam module element 20 exhibits a wide cup-shaped shape. Each side surface 24 is preferably inclined a first predetermined angle v1 in relation to the main surface 22, and wherein said first predetermined angle v1 is in the range of 5°-15°, preferably above 10°.

Another embodiment is illustrated in FIG. 8 that also shows a cross-sectional view of a steam module element. In this embodiment a second side surface 26 is arranged outside and along each first side surface 24, whereas the second side surface 26 is inclined a second predetermined angle v2 in relation to the main surface 22, preferably above 20°, and most preferred above 30°, wherein the second predetermined angle v2 is preferably greater than the first predetermined angle v1.

Figure 4:
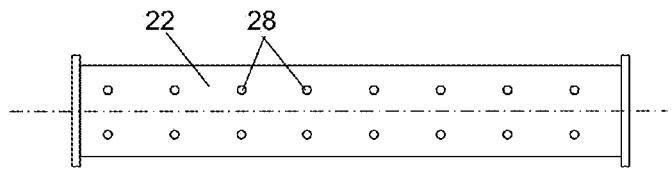

According to embodiments of the present invention the steam module elements 20 are provided with though-going openings 28, preferably equidistantly distributed along the main surfaces 22 of the elements 20. The openings 28 are illustrated in FIG. 4 and in the lower right view of FIG. 9.

The through-going openings provided on the steam generating elements enables excess water to pour down to the next level, i.e. the element below, such that continued evaporation may take place.

As indicated above the openings are preferably equidistantly arranged on the elements. However, other, more irregular distribution of the openings may naturally be possible. Openings in neighbouring steam generating elements may be offset with regard to each other.

The sizes of the openings are important in order to control how fast the water should leave one element and being supplied to the element below.

Many different parameters influence the sizes of the openings, e.g. the amount of water being supplied, the temperature of the elements, and the duration of the steaming stage of the baking procedure.

Tests have shown that the diameter of an opening advantageously is in the range of 2-15 mm.

Preferably, the openings are circular. However, other shapes are naturally possible, e.g. rectangular, elliptical, and even elongated shapes.

When the steam generating module is in the hot air state the position of the module 16 enables a vertical hot air flow 10 to pass the module 16, and wherein the vertical hot air flow passes by the module partly by flowing through the module, i.e. between the steam generating elements (see FIG. 6).

When the oven is in the steam generating state water is supplied to the steam module elements of the steam generating module. Water is preferably supplied via nozzles (not shown) arranged in the hot air channel.

It is common to provide steam into the oven early in the baking procedure.

The steam generating module is then in a steam generating state where the module is arranged such the surfaces of the steam generating elements are in a generally horizontal position. Thereby a large surface area, the area of the steam generating elements, is obtained which is important in order to maximize the heat transfer to the water and to have a complete evaporation of all the water being supplied.

When the steam generating state is terminated the steam generating module is rotated 90° around its longitudinal axis in order to reduce the surface area of the module to enable a vertical hot air flow to easily pass the module. The vertical hot air flow passes by the module partly by flowing through the module, i.e. between the steam generating elements, and partly by passing on either sides of the module.

To optimize the vertical hot air flow the angled side surfaces of the elements must not be too inclined in relation to the main surface in order not to unnecessarily obstruct the hot air flow.

Thus, when the steam generating state is terminated the module is rotated and then the hot air fan is started and the baking procedure is continued.

Figures 2, 3:
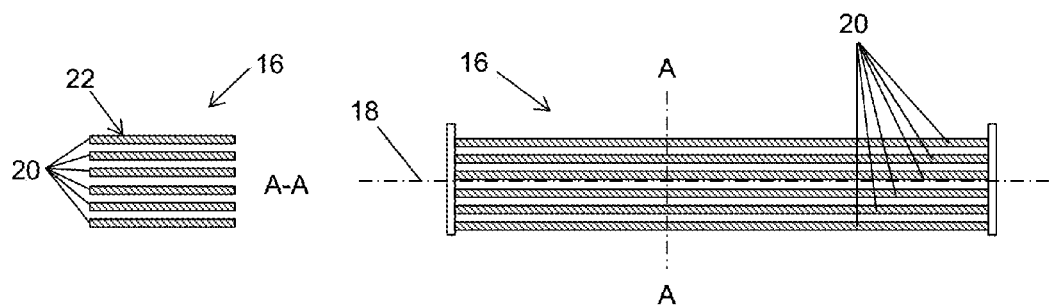
FIGS. 2-4 show different views of a steam generating module according to the present invention.

FIG. 2 is a cross-sectional view of a steam generating module 16 provided with steam module elements 20 having each main surface 22.

FIG. 3 is a cross-sectional view of a steam generating module 16 along the longitudinal axis 18. The view in FIG. 2 is along A-A.

FIG. 4 is a view from above of a steam generating element illustrating the openings 28.

FIGS. 5 and 6 illustrate the module in the two different states. In the hot air state illustrated in FIG. 6 the hot air flow is shown by arrows.

In FIG. 9 different views of the steam generating module is shown. To the left a cross-sectional view along line B-B in the upper right side view of the module is shown. The upper right view shows a side view of the module, and the lower right view shows a view from above of the module.

Advantageous embodiments of the present invention will now be further discussed with references to FIGS. 10-14. These figures illustrate different surface structures of the steam generating element 20.

Those embodiments relate in particular to the steam generating elements 20 being arranged in parallel above each other at a predetermined distance from each other, and specifically to the main surface of the steam generating element 20 which is made up of at least two surface levels, an upper surface level 30, and a first lower surface level 32.

The FIGS. 10-12 show cross-sectional views of the steam generating element according to different embodiments.

It should be noted that the different embodiments related to the structure of the main surface of the steam generating elements may be combined with any of the embodiments described above.

By providing two, or more, surface levels of the main surface, an improved evaporation process is achieved.

Thus, when water is supplied to the main surface the immediate evaporation results, on the upper surface level, in that a gas bubble under the water is formed. This will force the water up away from the surface. The lower surface level(s) will also heat the water and the gas pressure that is needed to lift the water is increased and the evaporation speed is increased.

The different surface levels are constructed by providing channels or indentations on the main surface where the evaporated gas can leak out so as not to trap the gas. This will force a continuous evaporation until the energy isn't enough to keep the water above the surface. The water will evaporate until the surface has reached an equilibrium state with the surrounding, which depends on the pressure, temperature and humidity.

The main idea is to provide different surface levels in order to improve the evaporation process. This may be achieved in many different ways and in the following some examples are illustrated which not should be interpreted limiting the scope of protection which are defined by the appended claims.

Generally, the first lower surface is defined by channels 34 of a channel grid made in the main surface, and that the first lower surface level 32 is defined by the bottom of said channels 34. See FIGS. 10-12.

Advantageously, the channels 34 are essentially orthogonal in relation to each other, which are illustrated by FIGS. 13 and 14.

In the example illustrated by FIG. 10 the upper surface level 30 is defined by the upper surfaces 36 of cubes formed by the channel grid. This embodiment is also illustrated by the top view in FIG. 13. The sides of the square of the upper surfaces are approximately in the range of 0.5-2.5 mm.

In the example illustrated by FIG. 11 the upper surface level is defined by the upper surfaces 38 of truncated pyramids formed by the channel grid.

In the example illustrated by FIG. 12 the upper surface level is defined by upper planar circular surfaces 40 formed by the channel grid. This embodiment is also illustrated by the top view in FIG. 14.

The structure may also be described as that the lower surface level 32 is made up by indentations in the main surface.

For all different structures described herein, the upper surface level 30 has an area A and the first lower surface level 32 has an area B. The relationship A/B may be used to define the properties of the main surface.

Different tests have shown that advantageous results have been achieved when the relationship between A and B is less than 0.5.

In the embodiment illustrated in FIG. 13 A/B is approximately 0.25, which has proven to result in an advantageous evaporation process.

The distance $d_1$ between the upper surface level 30 and the first lower surface level 32 is approximately 0.3-0.7 of a thickness of the steam generating element. The distance $d_1$ is indicated in FIGS. 10-12.

The distance between the upper surface level (30) and the first lower surface level (32) is in the interval of 0.5-3.0 mm, dependent on the overall thickness of the steam generating element, which (see above) is approximately 4-8 mm.

FIGS. 15 and 16 show top views of the steam module element, according to further embodiments of the invention.

FIG. 15 shows a top view of a steam module element 20, e.g. made from chromium steel, and provided with quadratic through-going openings 28 having a side of 16 mm. At the top of this figure is also illustrated a cross-sectional view of the steam module element 20.

FIG. 16 shows a top view of a steam module element 20 made from chromium steel provided with quadratic through-going openings 28 having a side of 10 mm.

Also circular, elliptical, or other shapes of the openings are possible within the scope of the invention as defined by the claims.

The through-going openings are distributed on the steam module element in a predetermined pattern; the openings are preferably evenly distributed. The numbers of openings are preferably in the interval of 25-100.

In both illustrated embodiments the openings 28 are lined up along lines (one is indicated as dashed in the figures) in an angle v of approximately 30-60 degrees, e.g. 45 degrees, in relation to the side of the element.

FIGS. 17-19 show a perspective view, a cross-sectional view and a top view, respectively, of the steam module element, according to a still further embodiment of the invention.

In this embodiment the steam module element 20 is provided with channels (indentations) 34 in the main surface running along the longitudinal axis of the element.

FIG. 18 illustrates a cross-sectional view along line A-A in FIG. 19.

Generally, the channels 34 are defined by an upper surface level 30, and a first lower surface level 32 defined by the bottom of the channels 34. In this embodiment a number of through-going openings 28 are provided, in the figure four openings are illustrated. They have an elongated shape, e.g. rectangular, and are arranged along a longitudinal symmetrical line of the steam generating element.

In order to further improve the understanding of the present invention additional information regarding the Leidenfrost effect is given below.

The Leidenfrost effect is a phenomenon in which a liquid, in near contact with a mass significantly hotter than the liquid's boiling point, produces an insulating vapor layer which keeps that liquid from boiling rapidly. This is most commonly seen when cooking; one sprinkles drops of water in a pan to gauge its temperature—if the pan's temperature is at or above the Leidenfrost point, the water skitters across the metal and takes longer to evaporate than it would in a pan that is above boiling temperature, but below the temperature of the Leidenfrost point. The effect is also responsible for the ability of liquid nitrogen to skitter across floors. It has also been used in some potentially dangerous demonstrations, such as dipping a wet finger in molten lead or blowing out a mouthful of liquid nitrogen, both enacted without injury to the demonstrator. The latter is potentially lethal, particularly should one accidentally swallow the liquid nitrogen.

The effect can be seen as drops of water are sprinkled onto a pan at various times as it heats up. Initially, as the temperature of the pan is below 100° C., the water just flattens out and slowly evaporates. As the temperature of the pan goes above 100° C., the water drops hiss when touching the pan and evaporate quickly. Later, as the temperature exceeds the Leidenfrost point, the Leidenfrost effect comes into play. On contact with the pan, the water droplets bunch up into small balls of water and skitter around, lasting much longer than when the temperature of the pan was lower. This effect works until a much higher temperature causes any further drops of water to evaporate too quickly to cause this effect.

This is because at temperatures above the Leidenfrost point, the bottom part of the water droplet vaporizes immediately on contact with the hot plate. The resulting gas suspends the rest of the water droplet just above it, preventing any further direct contact between the liquid water and the hot plate. As steam has much poorer thermal conductivity, further heat transfer between the pan and the droplet is slowed down dramatically. This also results in the drop being able to skid around the pan on the layer of gas just under it. The resulting gas holds the bubble via the gas pressure that is built up as a result of the surface properties. This is the case of the liquid bubble traveling uphill. According to the invention the surface is so arranged that the when a water bubble is heated gas is formed underneath and the bubble will start traveling uphill on an uneven surface forcing the liquid to further evaporate as it travels. As the steam module elements cool down, the elements will, instead of boiling the liquid, preheat the liquid before it travels via the holes down the adjacent element below The temperature at which the Leidenfrost effect begins to occur is not easy to predict. Even if the volume of the drop of liquid stays the same, the Leidenfrost point may be quite different, with a complicated dependence on the properties of the surface, as well as any impurities in the liquid. Some research has been conducted into a theoretical model of the system, but it is quite complicated. As a very rough estimate, the Leidenfrost point for a drop of water on a frying pan might occur at 193° C.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. An oven comprising:
an external housing which encloses an oven chamber;
a hot air channel where hot air is configured to flow;
a hot air inlet in the form of a series of openings in a wall of the oven chamber through which the hot air is blown into the oven chamber;
an exhaust outlet via which hot air is removed from the oven chamber; and
a door attached to the external housing; and
a steam generating system comprising:
a control unit adapted to control a baking or cooking procedure by generating control signals;
at least one elongated steam generating module horizontally arranged in said hot air channel, said steam generating module being rotatable about a longitudinal axis and comprising a predetermined number of steam module elements, wherein each steam module element is elongated and comprises one main surface provided with a flat extension, the steam generating elements are arranged in parallel above each other at a predetermined distance from each other; and
at least one water supplying member arranged in connection to said steam generating module and configured to supply water to said steam generating module;
wherein said steam generating module is adapted to switch between two states:
a steam generating state, wherein water is supplied during at least a part of said steam generating state via the at least one water supplying member to said steam generating module, and during said steam generating state the main surfaces of the steam module elements are in an essentially horizontal position transverse to a direction of hot air flow through the hot air channel, wherein the hot air heats the main surfaces of the steam module elements when the steam module elements are in the essentially horizontal position allowing water to evaporate,
a hot air state where the main surfaces of the steam module elements are in an essentially vertical position extending along the direction of the hot air flow through the hot air channel allowing the hot air to at least in part pass between the steam module elements of the steam generating module.

2. The oven according to claim 1, wherein the steam generating module is configured to receive control signals from the control unit and rotate 90° around a longitudinal axis of the steam generating module between the steam generating state and the hot air state based on the control signals from the control unit.

3. The oven according to claim 1, wherein hot air received from the hot air inlet heats said steam generating module prior to the steam generating module being in the steam generating state, and wherein the steam generating module is heated to a temperature such that the Leidenfrost effect will occur when water is supplied to the module.

4. The oven according to claim 1, wherein said steam module element comprises the one main surface and two first side surfaces, where each first side surface is arranged along a long side of the main surface, wherein each first side surface is inclined in relation to the main surface such that the steam module element exhibits a wide cup-shaped shape.

5. The oven according to claim 4, wherein each first side surface is inclined a first predetermined angle in relation to the main surface, and wherein said first predetermined angle is in the range of 5°-15°.

6. The oven according to claim 5, wherein a second side surface is arranged outside and along each first side surface, whereas each second side surface is inclined a second predetermined angle in relation to the main surface.

7. The oven according to claim 1, wherein said steam module elements are provided with through-going openings.

8. The oven according to claim 7, wherein said through-going openings have a rectangular or quadratic shape.

9. The oven according to claim 1, wherein said main surface is made up of at least two surface levels, an upper surface level, and a first lower surface level.

10. The oven according to claim 9, wherein said first lower surface level is defined by channels in a channel grid made in said one main surface, wherein said first lower surface level is defined by the bottom of said channels.

11. The oven according to claim 10, wherein said channels run along a longitudinal axis of said steam module element.

12. The oven according to claim 10, wherein said channels in the channel grid are essentially orthogonal in relation to each other.

13. The oven according to claim 12, wherein said upper surface level is defined by upper surfaces of cubes formed by said channel grid.

14. The oven according to claim 12, wherein said upper surface level is defined by upper surfaces of truncated pyramids formed by said channel grid.

15. The oven according to claim 9, wherein said lower surface level is made up by indentations in said main surface.

16. The oven according to claim 9, wherein the upper surface level has an area A and the first lower surface level has an area B, and wherein the ratio of A/B is less than 0.5.

17. The oven according to claim 9, wherein a distance between said upper surface level and said first lower surface level is 0.3-0.7 of a thickness of the steam generating module.

18. The oven according to claim 9, wherein a distance between said upper surface level and said first lower surface level is in the interval of 0.5-3.0 mm.

19. The oven according to claim 1, wherein said steam module elements are made from chromium steel.

* * * * *